(12) United States Patent
Ix

(10) Patent No.: US 12,148,049 B2
(45) Date of Patent: Nov. 19, 2024

(54) METHOD, APPARATUS AND COMPUTER PROGRAM PRODUCT FOR IDENTIFYING ACCOUNTS OF INTEREST IN A NETWORK

(71) Applicant: Vocalink Limited, London (GB)

(72) Inventor: Sebastian Ix, London (GB)

(73) Assignee: Vocalink International Limited, London (GB)

( * ) Notice: Subject to any disclaimer, the term of this patent is extended or adjusted under 35 U.S.C. 154(b) by 231 days.

(21) Appl. No.: 17/549,587

(22) Filed: Dec. 13, 2021

(65) Prior Publication Data

US 2022/0198578 A1    Jun. 23, 2022

(30) Foreign Application Priority Data

Dec. 22, 2020 (GB) ...................................... 2020369

(51) Int. Cl.
*G06Q 40/12* (2023.01)
(52) U.S. Cl.
CPC .................................. *G06Q 40/12* (2013.12)
(58) Field of Classification Search
None
See application file for complete search history.

(56) References Cited

U.S. PATENT DOCUMENTS

| | | | | |
|---|---|---|---|---|
| 8,079,081 B1 * | 12/2011 | Lavrik | ................... | H04L 41/069 726/22 |
| 8,302,187 B1 * | 10/2012 | Gupta | ................. | H04L 65/1079 726/28 |
| 9,361,322 B1 * | 6/2016 | Dutta | ..................... | G06F 16/435 |
| 9,886,700 B1 * | 2/2018 | Allouche | ............ | G06Q 10/0639 |
| 10,362,169 B1 * | 7/2019 | Sanderlin | .............. | H04M 3/493 |
| 11,334,883 B1 * | 5/2022 | Auerbach | ............ | G06Q 20/223 |
| 11,374,952 B1 * | 6/2022 | Coskun | .................. | G06N 3/045 |
| 11,522,700 B1 * | 12/2022 | Auerbach | ............. | H04L 9/3213 |

(Continued)

OTHER PUBLICATIONS

International Search Report and Written Opinion for PCT Application No. PCT/EP2021/082012 (Feb. 18, 2022).

*Primary Examiner* — Fateh M Obaid

(74) *Attorney, Agent, or Firm* — Hovey Williams LLP

(57) ABSTRACT

A method, apparatus and computer program product for identifying accounts of interest in a network are provided, the method comprising controlling circuitry to: receive information indicative of a plurality of target accounts, the plurality of target accounts including at least a portion of the accounts in the network; monitor for each target account of the plurality of target accounts, at a number of instances of time, connections between that target account and other accounts in the network; using a result of the monitoring, select target accounts associated with an increase of connections to accounts in the network with which the target account has no previous connection, above a first threshold level, as a first set of accounts; using a result of the monitoring, select target accounts associated with a decrease in connections to accounts in the network with which the target account has a previous connection, above a second threshold level, as a second set of accounts; and identify at least one target account of the plurality of target accounts as an account of interest when the at least one target account is present in both the first and second set of accounts.

20 Claims, 7 Drawing Sheets

(56) References Cited

U.S. PATENT DOCUMENTS

| | | | |
|---|---|---|---|
| 2010/0211445 A1* | 8/2010 | Bodington | G06Q 40/02 |
| | | | 705/14.28 |
| 2012/0180135 A1* | 7/2012 | Hodges | G06Q 10/10 |
| | | | 709/224 |
| 2015/0032614 A1* | 1/2015 | Ghosh | G06Q 20/34 |
| | | | 705/41 |
| 2017/0091756 A1* | 3/2017 | Stern | G06Q 40/06 |
| 2018/0108012 A1* | 4/2018 | Kohli | G06Q 30/02 |
| 2018/0129940 A1* | 5/2018 | Qian | G06Q 30/0241 |
| 2020/0034844 A1* | 1/2020 | Groarke | G06Q 20/4097 |
| 2020/0106689 A1* | 4/2020 | Dewar | H04L 67/535 |
| 2020/0226460 A1* | 7/2020 | Bruss | G06F 16/254 |
| 2021/0266167 A1* | 8/2021 | Lohe | G06Q 20/10 |
| 2021/0288981 A1* | 9/2021 | Numainville | H04L 63/1416 |
| 2022/0058709 A1* | 2/2022 | Aher | G06Q 30/0623 |
| 2022/0114592 A1* | 4/2022 | Anasta | B42D 25/285 |

* cited by examiner

METHOD, APPARATUS AND COMPUTER PROGRAM PRODUCT FOR IDENTIFYING ACCOUNTS OF INTEREST IN A NETWORK

CROSS REFERENCE TO RELATED APPLICATIONS

This application claims priority to United Kingdom Application No. 2020369.1, filed Dec. 22, 2020, which is incorporated herein by reference in its entirety

BACKGROUND

Field of the Disclosure

The field of the present disclosure relates to a method, apparatus and computer program product for identifying accounts of interest in a network.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

In recent years, there has been a significant increase in the use of online and electronic banking. That is, consumers now frequently use personal computing equipment (such as a personal computer or a mobile device) in order to connect to a network (such as the internet) to control operations related to their bank account. These operations may include conducting a transfer from their account to another account within the banking network, for example.

However, despite the convenience of online and electronic banking, banking fraud and scamming is becoming an ever increasing problem.

In a typical fraud or scam, a perpetrator of fraud will illegally obtain funds from a victim's bank account. In some situations, this may be via a "phishing" or "malware" attack, where access to the victim's banking accounts or facilities is obtained. For example, a perpetrator of a fraud or scam may access and control a victim's account in order to deceptively obtain or disperse funds from the victims account.

Moreover, in some situations, a legitimate account may become involved in illicit activity. For example, the owner of the account may themselves be persuaded (wittingly or unwittingly) into performing certain fraudulent or money laundering activities using an account which has been legitimately established (such as a personal banking account). Fraudulent, or potentially fraudulent, activity performed with a legitimate account can be very technically challenging to identify during investigations into fraudulent activity.

Indeed, banking networks are very complex and comprise a very large number of individual accounts. Moreover, the number of transactions between the accounts in the banking network can be very high. Indeed, in an economy such as that of the United Kingdom, the number of transactions occurring between accounts could reach a rate of around 300 transactions per second, or sometimes even more than this. Owing to the number of transactions and complexity of the banking network, efficient and reliable detection of fraudulent activity and/or fraudulent accounts becomes very difficult to achieve.

It is an aim of the present disclosure to provide a technical solution to address these issues.

SUMMARY

According to a first aspect of the disclosure, a method of identifying an account of interest is provided, the method comprising: controlling circuitry to: receive information indicative of a plurality of target accounts, the plurality of target accounts including at least a portion of the accounts in the network; monitor for each target account of the plurality of target accounts, at a number of instances of time, connections between that target account and other accounts in the network; using a result of the monitoring, select target accounts associated with an increase of connections to accounts in the network with which the target account has no previous connection, above a first threshold level, as a first set of accounts; using a result of the monitoring, select target accounts associated with a decrease in connections to accounts in the network with which the target account has a previous connection, above a second threshold level, as a second set of accounts; and identify at least one target account of the plurality of target accounts as an account of interest when the at least one target account is present in both the first and second set of accounts.

According to a second aspect of the disclosure, an apparatus for identifying an account of interest is provided, the apparatus comprising circuitry configured to: receive information indicative of a plurality of target accounts, the plurality of target accounts including at least a portion of the accounts in the network; monitor for each target account of the plurality of target accounts, at a number of instances of time, connections between that target account and other accounts in the network; using a result of the monitoring, select target accounts associated with an increase of connections to accounts in the network with which the target account has no previous connection, above a first threshold level, as a first set of accounts; using a result of the monitoring, select target accounts associated with a decrease in connections to accounts in the network with which the target account has a previous connection, above a second threshold level, as a second set of accounts; and identify at least one target account of the plurality of target accounts as an account of interest when the at least one target account is present in both the first and second set of accounts.

According to a third aspect of the disclosure, a computer program product comprising computer readable instructions which, when the instructions are implemented by a computer, cause the computer to perform a method of identifying accounts of interest in a network is provided, the method comprising: receiving information indicative of a plurality of target accounts, the plurality of target accounts including at least a portion of the accounts in the network; monitoring for each target account of the plurality of target accounts, at a number of instances of time, connections between that target account and other accounts in the network; using a result of the monitoring, selecting target accounts associated with an increase of connections to accounts in the network with which the target account has no previous connection, above a first threshold level, as a first set of accounts; using a result of the monitoring, selecting target accounts associated with a decrease in connections to accounts in the network with which the target account has a previous connection, above a second threshold level, as a second set of accounts; and identifying at least one target account of the plurality of target accounts as an account of interest when the at least one target account is present in both the first and second set of accounts.

According to embodiments of the disclosure, an account of interest in a network of accounts can be efficiently and reliably detected. In particular, by monitoring changes in an account's connections, the earliest signs of illicit behaviour (such as account takeovers or money-laundering activity) can be reliably detected enabling the account to be investigated and/or shut down before further illicit behaviour can be performed. Moreover, since efficient initial processing of the accounts in the network is performed in order to identify accounts which are potentially engaged in illicit behaviour, more detailed investigatory processing can be reserved for the accounts which have been identified as accounts of interest. This improves leads to improvements in processing efficiency when detecting fraudulent activity and fraudulent accounts in a network.

Of course, the present disclosure is not particularly limited to the aforementioned advantageous technical effects. Other advantageous technical effects will become apparent to the skilled person when reading the disclosure.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
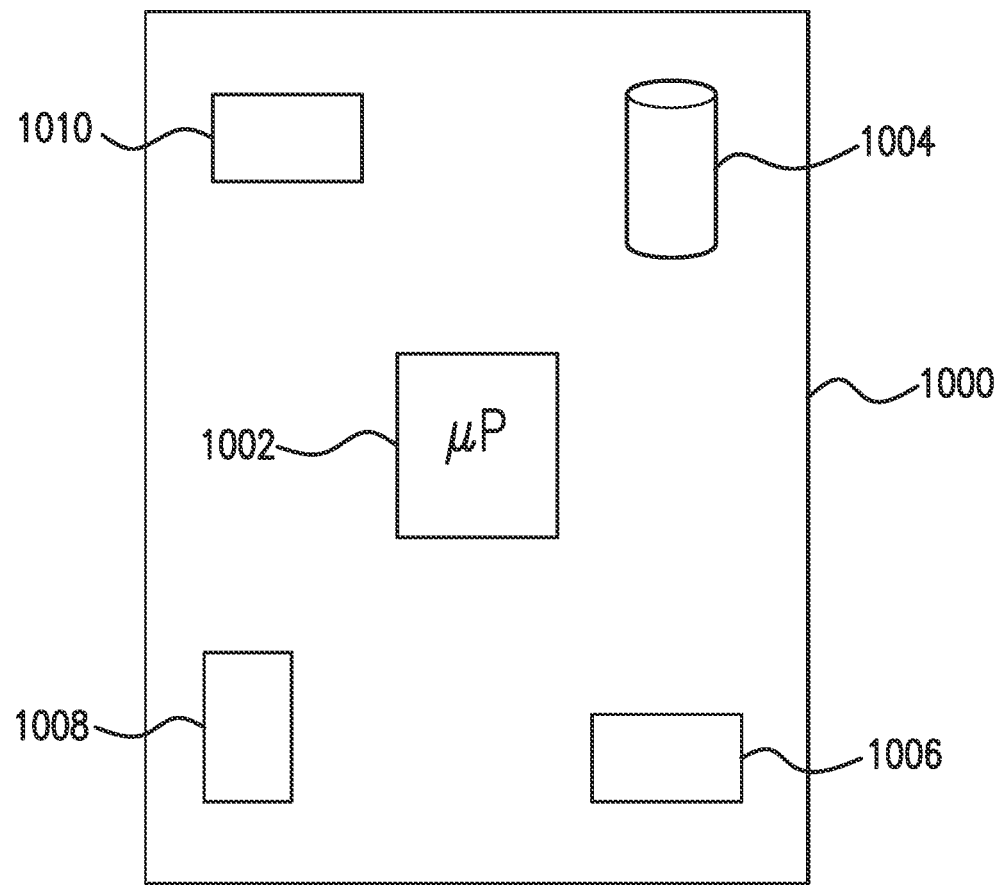
FIG. 1 illustrates an apparatus in accordance with embodiments of the disclosure.

Referring now to the drawings, wherein like reference numerals designate identical or corresponding parts throughout the several views.

Referring now to FIG. 1, an apparatus in accordance with embodiments of the disclosure is illustrated. Typically, an apparatus 1000 according to embodiments of the disclosure is a computer device such as a personal computer or a terminal connected to a server. Indeed, in embodiments, the apparatus may also be a server. The apparatus 1000 is controlled using a microprocessor or other processing circuitry 1002. More generally, the apparatus 1000 is a data processing apparatus.

The processing circuitry 1002 may be a microprocessor carrying out computer instructions or may be an Application Specific Integrated Circuit. The computer instructions are stored on storage medium 1004 which may be a magnetically readable medium, optically readable medium or solid state type circuitry. The storage medium 1004 may be integrated into the apparatus 1000 or may be separate to the apparatus 1000 and connected thereto using either a wired or wireless connection. The computer instructions may be embodied as computer software that contains computer readable code which, when loaded onto the processor circuitry 1002, configures the processor circuitry 1002 to perform a method according to embodiments of the disclosure.

Additionally connected to the processor circuitry 1002, is a user input unit 1008. The user input unit 1008 may be a touch screen or may be a mouse or stylus type input device. The user input 1008 may also be a keyboard or any combination of these devices. Furthermore, in some examples, the user input unit 1008 may also be a voice input device (such as a microphone device or the like) which is configured to receive sounds (such as a spoken command or the like) as input.

Communication circuitry 1010 is also coupled to the processing circuitry 1002. The communication circuitry 1010 may provide a connection to a Local Area Network or a Wide Area Network such as the Internet or a Virtual Private Network or the like. For example, the communication circuitry 1010 may be connected to infrastructure allowing the processor circuitry 1002 to communicate with other devices or infrastructure equipment in order to obtain or provide relevant data. For example, the communication circuitry 1010 may enable the apparatus 1000 to communicate with financial institutions in a banking network or the like. The communication circuitry 1010 may therefore be behind a firewall or some other form of network security.

Additionally coupled to the processing circuitry 1002, is a display device 1006. The display device, although shown integrated into the apparatus 1000, may be separate to the apparatus 1000 and may be an electronic display (e.g. liquid crystal display (LCD) or the like) or some kind of device allowing the user to visualise the operation of the system. In addition, the display device 1006 may be a printer or some other device allowing relevant information generated by the apparatus 1000 to be viewed by the user or by a third party.

Figure 2:
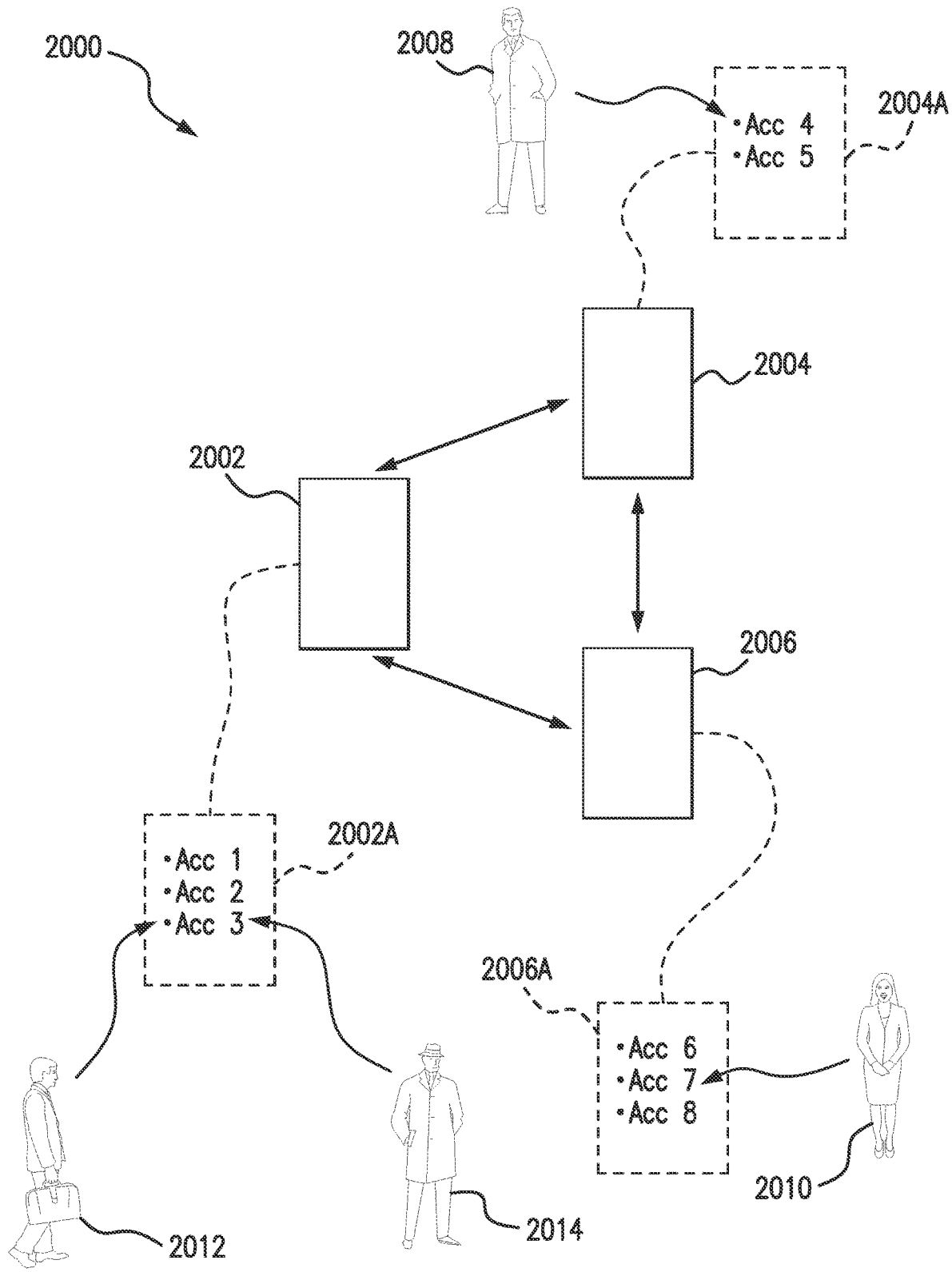
FIG. 2 illustrates an example network of accounts in accordance with embodiments of the disclosure.

Turning now to FIG. 2, an example network of accounts is illustrated.

In this example, a number of financial institutions (e g banking institutions) 2002, 2004 and 2006 are shown. Together, these financial institutions 2002, 2004 and 2006 form part of the network of accounts 2000. Each of the financial institutions in this example is connected to a network (such as a banking network) via which messages can be exchanged between the financial institutions.

A number of accounts are associated with each of the financial institutions. For example, a number of accounts 2002A, including Account 1, Account 2 and Account 3, are associated with financial institution 2002. Likewise, accounts 2004A are associated with financial institution 2004 while accounts 2006A are associated with financial institution 2006. These accounts may, in this example, be bank accounts. However, more generally, each account is a record in the system identifiable by a unique identifier (such as account number) which can be used in order to store information regarding a commodity belonging to the owner of the account. When the account is a bank account, for example, the account may be used in order to store funds belonging to the owner of the account.

By exchanging messages across the network, an account in the network may interact with one or more other accounts in the network (belonging to either the same financial institution and or one or more other financial institutions in the network).

Consider now Account 4, held with financial institution 2004. Person 2008 is the owner of Account 4. Person 2008 may wish to transfer a portion of the funds held in their account across the network to Account 7 (which is owned by person 2010). In order to conduct the transfer, person 2008 may provide instructions to financial institution 2004 authorising a transfer of funds between Account 4 and Account 7. When successful authentication has been provided (such as a passcode or the like), financial institution 2004 will conduct a transfer of funds (through an exchange of messages) with financial institution 2006 over the network. In this way, person 2008 may transfer funds to person 2010. Person 2010 may then withdraw the funds (from an Automated Teller Machine or the like) or use the funds in a further interaction with one or more of the other bank accounts in the network.

As noted above, the transfer of funds from one account to another account requires successful authentication of the person who wishes to conduct the transfer. Indeed, a number of security protocols may be implemented in order to verify that the person instructing an operation (such as a transfer) is the legitimate owner of the account who has the authority to instruct said operation.

Nevertheless, despite these security protocols, the accounts may be vulnerable to one or more of a "phishing" or "malware" attack, where fraudulent access to the victim's banking accounts or facilities is obtained. An example of a phishing attack is where a fraudster (such as person 2014 in this example) convinces a victim (such as person 2012) to provide secret information regarding the account (such as a password or the like) which can subsequently be used in order to gain unauthorised access to the victim's account. Once a fraudster has gained unauthorised access to the victim's account, they may control the victim's account in order to deceptively obtain or disperse funds from the victims account.

In the example of FIG. 2 of the present disclosure, once the fraudster 2014 has gained access to Account 3 (using secret information obtained fraudulently from person 2012) the fraudster 2014 may use Account 3 to engage in a plethora of illicit activity (including fraudulent transfer of funds across the network, for example). The longer the fraudulent activity continues without detection, the more difficult it becomes to recover funds which have been stolen as the fraudster 2014 may use several techniques to obfuscate the dispersion of the funds across the network.

Furthermore, it can be very difficult to identify fraudulent activity (such as money laundering) which occurs using an account which has been legitimately established. For example, Account 7 may have been established by person 2010 for legitimate purposes (such as for transferring funds to person 2012). However, person 2010 may be persuaded (wittingly or unwittingly) to perform certain money laundering activities using their legitimate account, Account 7 (which may be, for example, their personal banking account). Use of the legitimate account in order to perform the money laundering activity integrates the illegitimate behaviour amongst legitimate transfers, making it very difficult and computationally challenging to identify the illegitimate behaviour and recover funds linked to the money laundering activity.

Of course, the present disclosure is not particularly limited to the example network of accounts illustrated in FIG. 2 of the present disclosure. There may be many more financial institutions and/or accounts in the network than illustrated in FIG. 2, for example.

A number of systems may be implemented in order to investigate individual transfers and accounts in an attempt to detect fraudulent or illicit activity. Nevertheless, owing to the size of the network of accounts, and the number of transactions which are performed, it can be very computationally demanding to perform these investigations. Significant numbers of fraudulent transfers and fraudulent accounts may therefore go undetected.

For at least these reasons, and those reasons as outlined in the Background of the present disclosure, it is desired that a technical solution is provided which enables computationally efficient and reliable identification of accounts which may be engaged in illicit activity (or any other activity of interest) from amongst accounts in the network.

Hence, an apparatus for identifying an account of interest in a network of accounts is provided in accordance with embodiments of the disclosure.

<Apparatus>

Figure 3:
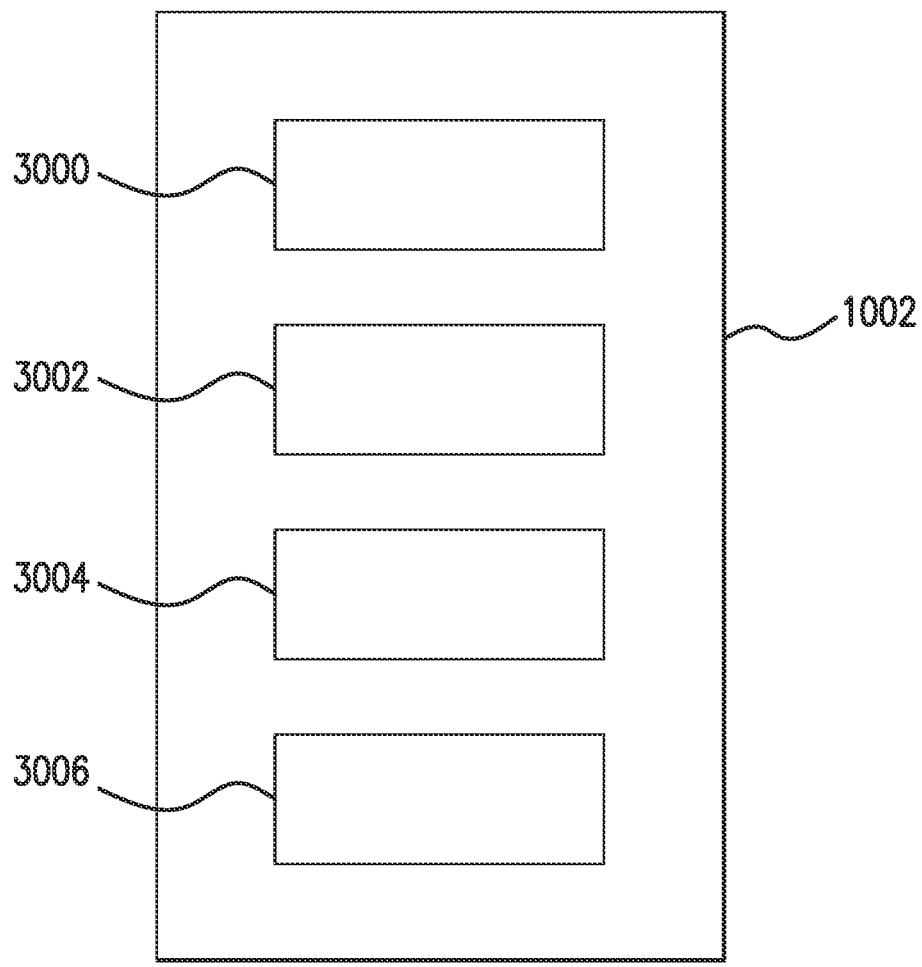
FIG. 3 illustrates an example configuration of an apparatus in accordance with embodiments of the disclosure.

FIG. 3 illustrates an example configuration of an apparatus 1000 in accordance with embodiments of the disclosure. In this example configuration, the apparatus 1000 comprises a receiving unit 3000, a monitoring unit 3002, a selecting unit 3004 and an identifying unit 3006.

According to embodiments of the disclosure, the receiving unit 3000 is configured to receive information indicative of a plurality of target accounts, the plurality of target accounts including at least a portion of the accounts in the network. Then, the monitoring unit 3002 is configured to monitor for each target account of the plurality of target accounts, at a number of instances of time, connections between that target account and other accounts in the network. Using a result of the monitoring, the selecting unit 3004 is configured to select target accounts associated with an increase of connections to accounts in the network with which the target account has no previous connection, above a first threshold level, as a first set of accounts. Furthermore, using a result of the monitoring, the selecting unit 3004 is configured to select target accounts associated with a decrease in connections to accounts in the network with which the target account has a previous connection, above a second threshold level, as a second set of accounts. Finally, the identifying unit 3006 is configured to identify at least one target account of the plurality of target accounts as an account of interest when the at least one target account is present in both the first and second set of accounts.

Figure 4A:
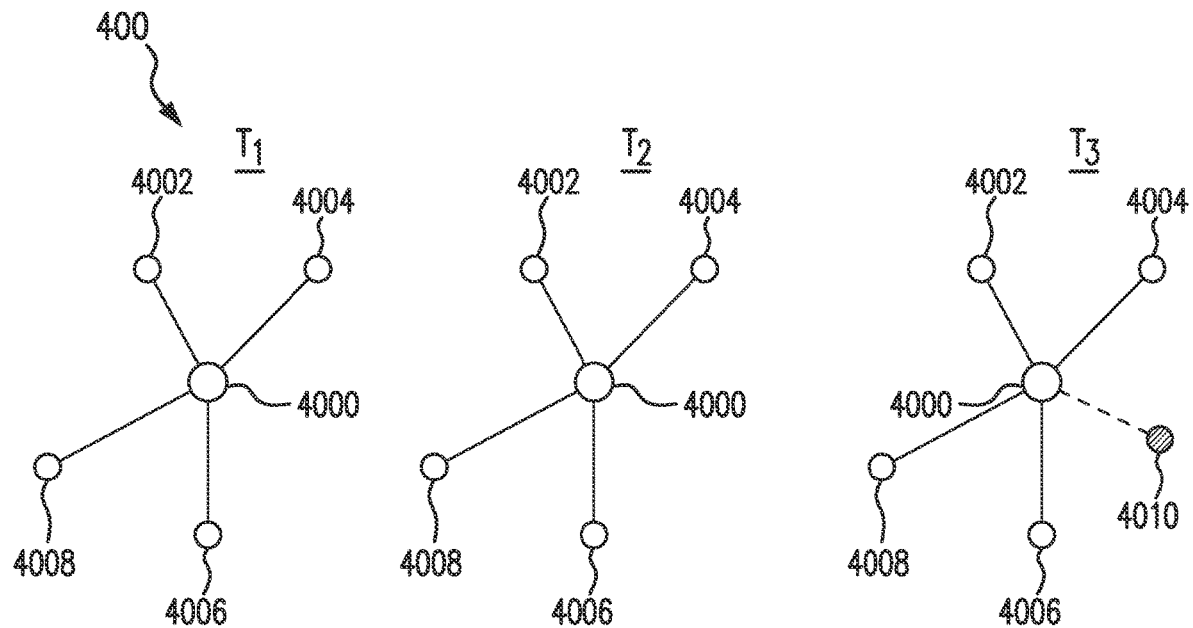
FIG. 4A illustrates an example of connections between accounts in accordance with embodiments of the disclosure.
Figure 4B:
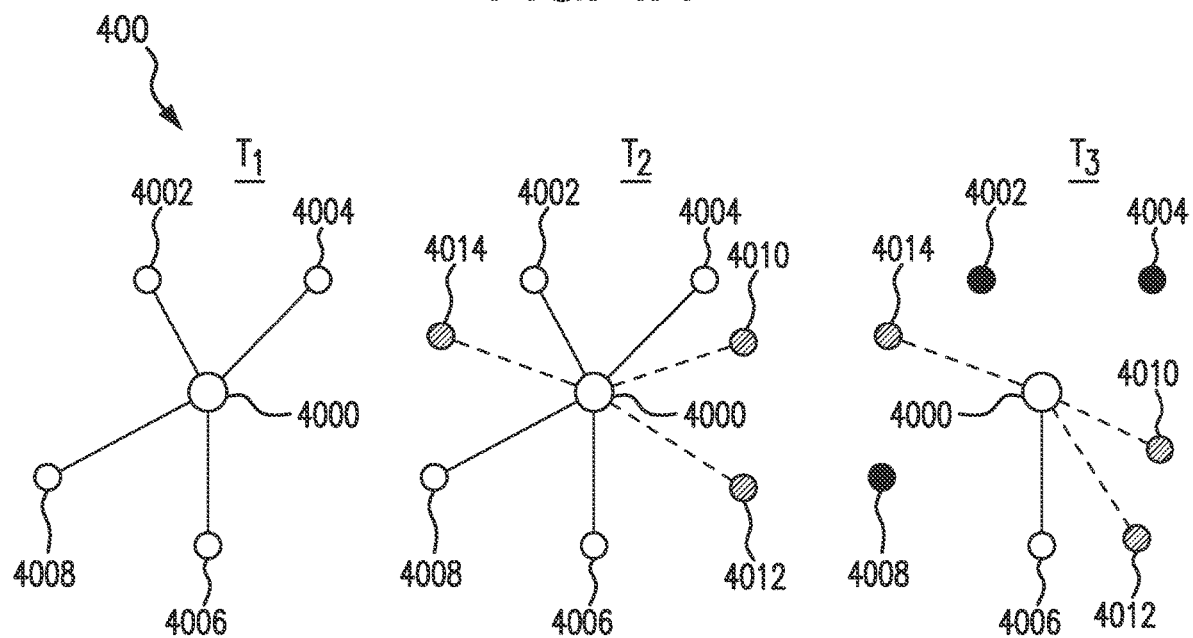
FIG. 4B illustrates an example of connections between accounts in accordance with embodiments of the disclosure.
Figure 5:
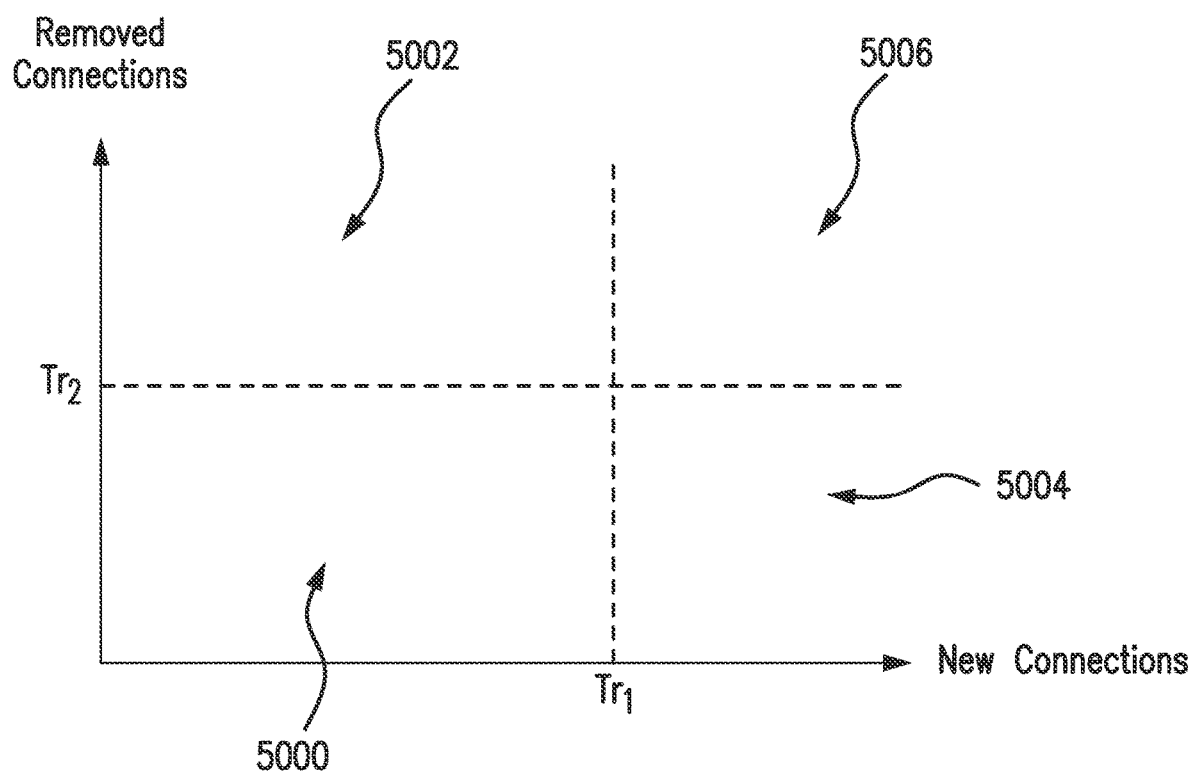
FIG. 5 illustrates an example of a selection process for accounts in accordance with embodiments of the disclosure.
Figure 6:
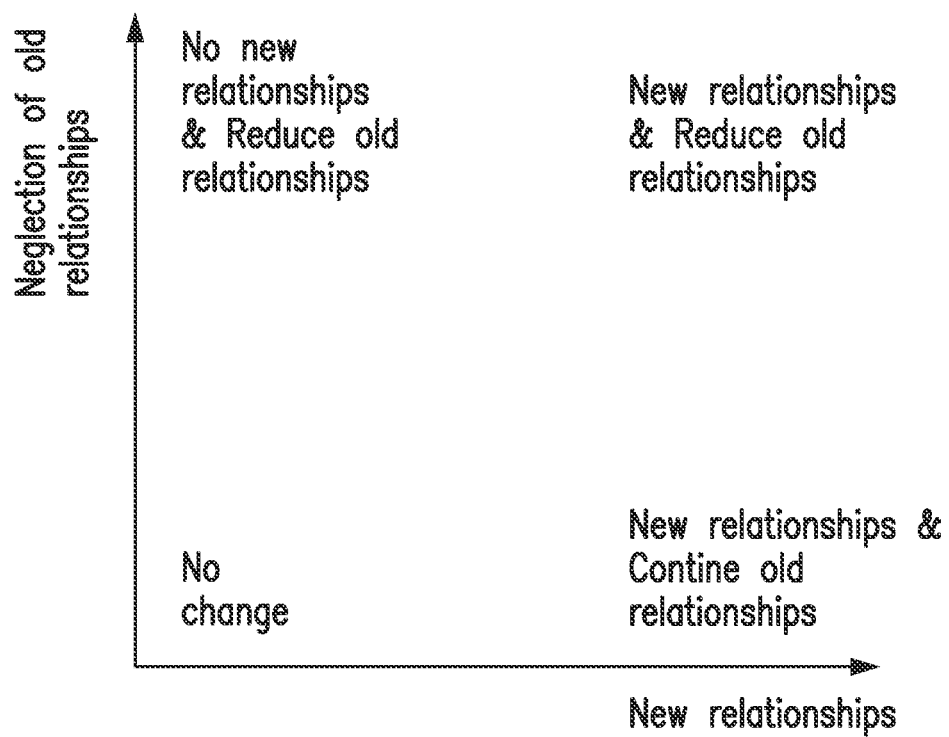
FIG. 6 illustrates an example of a selection process for accounts in accordance with embodiments of the disclosure.

Further details of the apparatus for identifying accounts of interest in a network will now be provided with reference to FIGS. 4 to 6 of the present disclosure.

<Receiving Unit>

As described with reference to FIG. 3 of the present disclosure, the receiving unit 3000 is configured to receive information indicative of a plurality of target accounts.

The receiving unit may, in examples, receive information using a connection to a network (such as a local network or the internet, for example). In examples, the receiving unit may use communication circuitry 1010 as described with reference to FIG. 1 of the present disclosure in order to receive information regarding the plurality of accounts. In fact, this information regarding the plurality of accounts may be received via any suitable wired or wireless connection as required depending on the situation.

In some examples, the information indicative of the plurality of accounts may form a request to begin monitoring a selection of the accounts of the network of accounts. Consider again the example described with reference to FIG. 2 of the present disclosure. In this example, a number of accounts are held, respectively, by each of the financial institutions 2002, 2004, 2006 in the banking network. Accordingly, the information indicative of the plurality of accounts may comprise information regarding the accounts of a first financial institution (such as financial institution 2002). This information would then form a request that the apparatus 1000 began monitoring the accounts 2002A of that financial institution 2002. Alternatively, the accounts for which the information is received may comprise a mixture of accounts from a number of different financial institutions (e.g. Accounts 1 and 2 of 2002A, and Account 6 of 2006A).

In other examples, the information indicative of a plurality of target accounts may comprise information of all of the accounts of the network of accounts. In this example, all of the accounts of the network would then be target accounts subject to the monitoring performed by apparatus 1000.

The specific form of the information which is received in the information indicative of the plurality of target accounts is not particularly limited and will vary depending on the type of accounts which are present in the network of accounts. However, in the specific example of the banking network as described with reference to FIG. 2 of the present disclosure, the information may comprise a unique identifier of each account (such as a unique account number and/or sort code corresponding to each account). However, any information uniquely identifying each of the target accounts may be used as required.

The information indicative of the plurality of target accounts may be received from a party in the network who is interested in identifying accounts of interest. In the example described with reference to FIG. 2 of the present disclosure, an investigator or group of investigators associated with a financial institution (such as financial institution 2002) may be interested in identifying whether any of the accounts associated with their financial institution are accounts of interest which warrant further investigations. In this case, information indicative of the accounts held by that financial institution may be provided to apparatus 1000 as information indicative of a plurality of target accounts as a request to monitor the request of that financial institution. In examples, a number of concurrent sets of information indicative of target accounts may be received (e.g. a separate request from each of financial institution 2002 and financial institution 2004). Each of these sets of information may be processed as separate requests, in parallel, by apparatus 1000.

By receiving information regarding a plurality of target accounts in this manner, the efficiency of identification of accounts of interest can further be improved because monitoring of accounts may be directed to a desired portion of accounts within the network of accounts. Moreover, since the portion of accounts can comprise all of the accounts in the network of accounts, flexibility is maintained such that network wide investigations for accounts of interest can be performed by apparatus 1000 if required.

<Monitoring Unit>

Once the information regarding the plurality of target accounts has been received, the monitoring unit 3002 is configured to monitor for each target account of the plurality of target accounts, at a number of instances of time, connections between that target account and other accounts in the network.

In the present disclosure, connections between accounts are formed by interactions between the accounts of the network. Connections are therefore indicative of the inter-relationships between respective accounts of the network.

Consider the example of FIG. 4A of the present disclosure, for example. In this example, connections between accounts in accordance with embodiments of the disclosure are illustrated.

In this example, an account 4000 of a network of accounts represents the target account which has been identified in the information which has been received by receiving unit 3000. The account, and its connections to other accounts in the network of accounts, is shown at a number of different instances of time T1, T2 and T3. In this example, account 4000 (whilst being monitored) is actually a legitimate account which is not engaged in any illicit behaviour (such as fraudulent transactions and/or money laundering activities, for example).

The time T1 is the earliest instance of time in this example, while the time T2 is an instance of time which occurs at a time after T1. The time T3 is an instance of time which occurs after the time T2.

At the first instance of time, it can be seen that the target account 4000 is connected to a number of other accounts in the network of accounts 4002, 4004, 4006 and 4008. As described with reference to the example of FIG. 2 of the present disclosure, these may be a mixture of accounts held by the same financial institution as that which holds the target account 4000 and/or accounts held by other financial institutions in the network.

Of course, it will be appreciated that there may be many more accounts in the network than those shown at time T1 in FIG. 4A. However, the accounts shown at time T1 in FIG. 4A represent only the accounts in the network with which the target account is connected at time T1.

As explained above, a connection is representative of the relationships between accounts in the network of accounts. A connection is therefore established by interactions between the accounts. As such, the accounts 4002, 4004, 4006 and 4008 are accounts with which account 4000 has, at time T1, previously interacted with.

In this example, where the accounts are bank account held by a financial institution, interactions between the accounts may include transfers of funds between the accounts. Specifically, a connection between account 4000 and account 4002 may have been established by a transfer of funds between account 4000 and account 4002 (or vice versa). Such a transfer may, in this example, have been a Faster Payments transfer, BACS transfer, CHAPS transfer or the like. Indeed, the connection between the accounts may have been established by a one-off transfer (such as a single transfer of funds from account 4000 to 4002) or, alternatively, may have been established by a regular, repeated or periodic transfer (such as a standing order and/or Direct Debit agreement).

Therefore, in this example, the target account 4000 has connections with each of accounts 4002, 4004, 4006 and 4008 at time T1. These accounts therefore represent a first-degree egocentric neighbourhood set of connections for account 4000 (being the accounts with which the target account 4000 directly interacts in the network of accounts).

A legitimate account in a network of account displays a series of connections similar to that illustrated at time T1 in FIG. 4A of the present disclosure. That is, an account (such as a bank account) typically has a stable collection of connections with a number of other accounts in the network of accounts. These accounts are other accounts in the network of accounts with which the target account interacts (e.g. by paying money to and/or receiving money from). These stable connections may be accounts held by other parties with which the account owner has an outstanding financial relationship (such as parents or other family members, an employer, a landlord or the like).

It will be appreciated that while the connections between accounts in a network related to a legitimate account remain stable, the connections (representative of the way in which an account interacts with its neighbourhood) are dynamic and will change over time. That is, there may be changes in connections when an account holder changes employer, for example. However, for a legitimate account (such as target account 4000 in this example), the connections with other accounts in the network remain substantially stable over time.

Consider time T2 in the example of FIG. 4A. At this time, occurring after time T1, the target account 4000 maintains the same connections as were shown at time T1 of FIG. 4A with other accounts in the network. That is, no new connections have been established by account 4000 with other accounts in the network of accounts. Moreover, no connections have been severed or removed between account 4000 and accounts with which a previous connection (at time T1) was held.

It will be appreciated that a connection between accounts may be removed for a number of reasons.

Firstly, a connection may be deemed no longer to exist between accounts in the network when there have been no further interactions between the accounts belonging to that relationship for a predetermined period of time after the most recent interaction. This may occur, for example, where a one-off transfer was made between target account 4000 and another account in the network (such as account 4008). A connection between the target account 4000 and the account 4008 would then be established when the transfer was made. However, if a predetermined period of time then elapsed after that transfer with no further transfers between those accounts, it can be determined that the relationship between target account 4000 and account 4008 has ended. Accordingly, the connection between target account 4000 and account 4008 may then, at that stage, be removed by the monitoring unit 3002. The predetermined period of time which must elapse between transfers in order that the connection is deemed no longer to exist may vary in accordance with the situation. However, in examples, the predetermined period of time may be a period of a couple of days, weeks or months, for example.

Furthermore, a connection may be removed at the request of the account owner, for example. That is, in a situation whereby a connection has been established at the request of the account owner based on a regular, repeated or periodic transfer (such as a standing order and/or a Direct Debit agreement) the connection may be removed when said regular, repeated or periodic transfer is canceled (such as the account owner canceling a Direct Debit agreement). This type of removal of connection may occur on a faster timescale than a deemed removal of connection, as it may occur at the time at which the regular, repeated or periodic transfer is canceled (and not a predetermined period of time after the last interaction between the accounts).

Nevertheless, as seen by comparison of time T2 of FIG. 4A with time T1 of FIG. 4A, there have been no changes in the connections between the target account 4000 and other accounts in the network in this example. Notably, this does not mean that no further transfers have been made or received by target account 4000 since time T1. Indeed, a number of additional transfers may have been made between target account 4000 and one or more of the accounts 4002, 4004, 4006 and 4008 with which a connection is already established (having been established at or before time T1). Rather, it means that no transfers (or other types of interaction) have occurred with accounts in the network with which a connection did not previously exist (i.e. there are no new connections to accounts in the network between time T2 and T1 in this example).

The connections between account 4000 and accounts 4002, 4004, 4006 and 4008 have therefore remained stable between times T1 and T2.

Consider now time T3 of the example of FIG. 4A. Here, it can be seen that connections between the target account 4000 and accounts 4002, 4004, 4006 and 4008 remain unchanged since both time T1 and time T2. However, a new connection with an account 4010, with which no previous connection was held, has been established. This new connection may have been established by a transfer of funds from account 4000 to account 4010 (such as a transfer of funds to a friend or family member to which funds had not previously transferred) or vice versa. This new connection is observed by monitoring unit 3002 following a comparison of the connections at time T3 with the connections which were present at a previous instance of time (such as time T1 and/or time T2).

Therefore, it can be seen that the connections of a legitimate account (such as target account 4000 in the example of FIG. 4A) remain substantially stable over time. That is, the majority of connections which were in place at time T1 are still in place at time T3. Moreover, only a small number of new connections (which were not previously in place) have been established. However, despite the stability of these connections, it will be appreciated that the connections are dynamic and new connections may be created, or previous connections removed, over time as the way in which the legitimate account interacts with the other accounts in the network develops over time.

Consider now the example of FIG. 4B of the present disclosure. In this example, connections between accounts in accordance with embodiments of the disclosure are illustrated.

In this example, an account 4000 of the network of accounts represents the target account which has been identified in the information which has been received by receiving unit 3000. The account, and its connections to other accounts in the network of accounts, is shown at a number of instances of time T1, T2 and T3. The instances of time T1, T2 and T3 are, in this example, the same as those described with reference to FIG. 4A of the present disclosure.

In this example account 4000 is an account which displays certain activities associated with illicit behaviour such as fraudulent and/or money laundering activity, for example.

At time T1, the account 4000 has connections with a number of accounts 4002, 4004, 4006 and 4008 as described with reference to FIG. 4A of the present disclosure. Indeed, these connections may be long standing connections between accounts with which the target account 4000 has established relationships (such as accounts of family members, employers and/or landlords for example). These connections are monitored by monitoring unit 3002 at time T1.

In this example, target account 4000 is a legitimate account (being an account which has been legitimately established and used for legitimate purposes by the account owner). However, at a time shortly after time T1, the owner of target account 4000 becomes a victim of fraud (such as a phishing attack). As such, a fraudster gains unauthorised access to target account 4000.

Then, at time T2, it can be seen that, since time T1, a number of new connections have been established by target account 4000 with accounts 4010, 4012, 4014. These connections have, in this example, been established by the fraudster after they have gained access to the victim's account (and may, for example, be representative of a series of transfers dispersing funds from the victim's account across the banking network). These new connections are observed by monitoring unit 3002 by a comparison of the connections at time T2 with those present at time T1. However, at this time, connections with previous account (e.g. accounts 4002, 4004, 4006 and 4008) remain in place. This may be, for example, because the victim is not aware that their account has been compromised and thus continues to use the account for legitimate purposes alongside the fraudster. Alternatively, this may be because, at this stage, sufficient time has not elapsed in order for the previous connections with accounts 4002, 4004, 4006 and 4008 to have been deemed to be removed (i.e. a predetermined period of time after the last interaction between those accounts).

Nevertheless, the rapid increase in new connections which has occurred between time T2 and T1 is not representative of the substantially stable changes in connections which are observed for a legitimate account.

Then, at time T3 of FIG. 4A, monitoring unit 3002 observes that further changes in the connections of target account 4000 have occurred. Here, monitoring unit 3002 observes that no new connections have been established since time T2. However, a number of long standing connections with accounts 4002, 4004 and 4008 have been removed. That is, at time T3, target account 4000 is no longer deemed to be connected to these previous accounts (with which a connection was present at time T1 and time T2). Only the connection to account 4006 remains when compared to time T1.

The rapid decrease in connections to accounts with which a previous connection was held may, in this example, be because the fraudster has taken over the account and has neglected transfers to accounts with which a legitimate connection was in place (e.g. family members or landlords, for example). Rather, the fraudster merely uses the account to transfer funds to the new accounts 4010, 4012, 4014 such that stolen funds can be dispersed from the victim as quickly and efficiently as possible.

Therefore, in contrast to the example of a legitimate account described in FIG. 4A of the present disclosure, monitoring unit 3002 can detect that there are substantial anomalies in the behaviour of account 4000 from time T1 to time T3 in the example of FIG. 4B of the present disclosure. These anomalies include the rapid increase in new connections coupled with a rapid removal of previous connections. Indeed, the first-degree egocentric neighbourhood collection of connections of account 4000 (being the other accounts in the network with which the target account is directly connected) have changed substantially from time T1 to time T3 as illustrated in FIG. 4B of the present disclosure.

Of course, it will be appreciated that the number of accounts, connections and instances of time illustrated in these examples of FIG. 4A and FIG. 4B is not particularly limiting to the present disclosure. Indeed, there may be substantially more accounts and/or connections depending on the situation to which embodiments of the disclosure are applied. Moreover, the number of instances of time at which the accounts are monitored by monitoring unit 3002 may be substantially more than the number of instances of time illustrated in this example. In fact, the duration of time which passes between each instance of time may also change. In examples, the duration of time which passes between each instance of time may be predetermined depending on the frequency of transfers and other interactions between accounts in the network. Furthermore, while FIGS. 4A and 4B have been described with reference only to a single target account (being account 4000) it will be appreciated that there may be many more target accounts than this (and indeed, the target accounts may include all the accounts in the network).

Moreover, it will be appreciated that the way in which the monitoring unit 3002 observes or monitors the changes in connections over time is not particularly limited and will vary depending on the situation.

In some example, the monitoring unit 3002 may be configured to monitor each target account by obtaining information regarding the creation or removal of connections between the target account and other accounts on the network. This may be advantageous, for example, in a situation where events which create and/or remove connections are recorded outside of the apparatus 1000. Consider the example of FIG. 2 of the present disclosure, for example. Here, a stream of transfers between accounts (and between financial institutions who hold those accounts) occurs over the network 2000 over time. This steam of transfers may be very large. In an economy such as the United Kingdom, the number of transfers (or transactions) occurring between accounts could reach a rate of around 300 transfers per second (or maybe even more than this). Monitoring unit 3002 of apparatus 1000 may therefore monitor this stream of transfers in order to identify transfers related to one or more to the plurality of target accounts. When a transfer related to one or more of the plurality of target accounts is observed, the monitoring unit 3002 may then process this transfer in order to determine whether any new connections are established and/or whether any previous connections have been removed. Then, at a number of instances of time, the monitoring unit 3002 may compare the connections for each of the target accounts in order to observe the changes (and rate of changes) in connections which have occurred for each of the target accounts.

In other examples, the information regarding the creation or removal of connections between the target account and other accounts on the network is stored in a storage unit. Here, each of the financial institutions may store, in a storage accessible by apparatus 1000, a list of the connections for each account (such as a list of the standing orders and/or Direct Debits which have been established for each account). Monitoring unit 3002 may access this storage in order to retrieve this information regarding connections amongst accounts in the network. Then, at a number of instances of time, the monitoring unit 3002 may compare the connections for each account in order to monitor changes in connections which have occurred.

Of course, the manner in which the monitoring unit 3002 is configured to monitor each of the target accounts will depend, at least in part, on the type of accounts which are being monitored (e.g. bank account or other type of account) and the situation to which the embodiments of the disclosure are applied.

<Selecting Unit>

Once the monitoring unit 3002 has monitored the target accounts, the selecting unit 3004 is configured to select accounts which are displaying certain anomalous behaviour.

As explained with reference to FIGS. 4A and 4B of the present disclosure, differences will be observed by the monitoring unit 3002 for legitimate accounts (or accounts not engaged in illicit behaviour) and illegitimate accounts (being accounts which may, for example, be engaged in fraudulent and/or money laundering activity). These differences may be utilized by the selecting unit 3004 in order to select accounts which are displaying certain patterns of behaviour.

Consider the example of FIG. 5 of the present disclosure. Here, an example of a selection process for accounts in accordance with embodiments of the disclosure is shown.

In FIG. 5 of the present disclosure, a graph (or parameter space) is used by selecting unit 3004 for the selection of accounts which exhibit certain behaviours as seen in a result from the monitoring unit 3002. That is, this graph provides a visual indication of the processing performed by selecting unit 3004 of the present disclosure. The number of new connections (being connections which have been created with accounts from which no previous connection was established) are displayed on the x-axis. Conversely, the number of removed connections (being connections which have been severed with accounts for which a previous connection was established) are displayed on the y-axis.

A number of regions 5000, 5002, 5004 and 5006 are shown on this parameter space. These regions are defined by two thresholds; threshold Tr. 1 and threshold Tr. 2. The position of the thresholds Tr. 1 and Tr. 2 in this example are illustrative and may vary depending on the situation (such as the type of accounts which have been monitored and/or the timescale over which those accounts have been monitored).

Region 5000 defines a region of the parameter space which is typically occupied by legitimate accounts (or accounts which are not engaged in any illicit behaviour). That is, this region of the parameter space (where the new connections are less than the Tr. 1 and the removed connections are less than Tr. 2) represents a region of parameter space where the connections between a target account and its neighbouring accounts remains substantial stable over time. This region of the parameter space may be occupied by an account such as account 4000 described with reference to FIG. 4A of the present disclosure, for example. Accounts in this region may display dynamic behaviour (such as a small increase or decrease in established connections) however, in general, the connections remain substantially stable and change gradually over time. An account in this region is not likely to be engaged in illicit behaviour.

Region 5002 defines a region of parameter space where an account displays somewhat unusual behaviour including an elevated rate of removal of connections with accounts with which a previous connection has been established. Accounts in this region may be accounts which have stopped interacting with accounts in the network with which long-running and/or frequent relationships have been established. That is, accounts in this region display a change in their behaviour linked to an account beginning to neglect its previous connections. However, accounts in this region 5002 of the parameter space do not display any unusual change in the number of new accounts which have been established. An account in this region is not likely to be engaged in illicit behaviour, as no rapid increase in the number of new accounts has been displayed.

In contrast, region 5004 defines a region of the parameter space where an account displays somewhat unusual behaviour including an elevated establishment of new connections with accounts with which no previous connection has been established. Accounts in this region may be accounts which has suddenly begun transferring funds to a number of new accounts in the network, for example. That is, accounts in this region display a change in their behaviour linked to an account beginning to rapidly establish a number of new connections which have not previously been identified. However, accounts in this region 5004 of the parameter space do not display any unusual change in the number of new accounts which have been established. Accounts within this region may be considered to be higher risk of being accounts involved in illicit behaviour, because rapid change in the number of new connections is often the first sign that an account has begun a shift behaviour patterns. Indeed, as described with reference to FIGS. 4A and 4B of the present disclosure, it is often quicker for an account to establish new connections (through a rapid increase in the number of new transfers) than it is for the account to neglect previous connections (which may only become apparent over a longer timescale). Therefore, accounts in this region are considered higher risk of being accounts which may be engaged in illicit behaviour. However, these accounts are not considered to be accounts of the highest level of suspicion, since the change of behaviour is confined only to the establishment of new connections (and not a neglection of older connections or relationships). Indeed, a number of legitimate accounts may also be present within this region of the parameter space, since an account may transition into this region when a series of new connections (such as when a person moves home and/or changes job, for example).

Finally, region 5006 defines a region of the parameter space where an account displays distinctly unusual changes in behaviour. The behaviour of accounts within this region of the parameter space is considered anomalous behaviour which can indicate the start of illicit behaviour (such as an account takeover and/or money laundering activity). Within this region, an account can be seen to have rapidly neglected a high number of previous connections (since the removed connections is above the threshold level Tr. 2) while also rapidly establishing a number of new connections (since the number of new connections is above the threshold level Tr. 1). Taken in combination, these changes are seen as suspicious since such anomalous behaviour is not typically seen in legitimate accounts which are being operated in their normal behavioural pattern. The accounts are therefore considered to be accounts which may be displaying the earliest sign of shift from legitimate to criminal behaviour.

It will be appreciated that this behaviour (rapid increases or decreases in the number of connections) is not limited to the situation of a fraudulent takeover of an account. Such behaviour of establishing a number of new connections, while simultaneously neglecting old connections, may also be observed if the owner of an account has been persuaded (willingly or unwillingly) to engage in certain money laundering activity. Here, a previously legitimate account (being an account opened and operated for legitimate activity) may begin to show changes towards illicit behaviour. The owner of such an account may receive some money to use their old previously legitimate (for which they no longer have any purpose) account for money laundering activity. This person may then begin to conduct a series of transfers from their account to a number of other accounts to disperse funds through the network as part of money laundering activity. Moreover, as the account is old, and the person has no further legitimate purpose for the account, the connections with previous accounts will be neglected. Accordingly, accounts engaged in money-laundering activity will also occupy region 5006 of the above described parameter space illustrated in FIG. 5 of the present disclosure.

Using this information regarding the changes in the account behaviour, the selecting unit 3004 of the apparatus 1000 can therefore categorise the target accounts which have been monitored by the monitoring unit 3002 using a result of the monitoring. Of course, it will be appreciated that accounts do not remain fixed in position on the parameter space illustrated in FIG. 5 of the present disclosure. Therefore, even an account which initially is of low interest (occupying region 5000) may transition into a higher interest region (such as 5006) and therefore be selected by selecting unit 3004 if there are changes in the way in which that account interacts with other accounts in the network.

It will be appreciated that the result of the monitoring which is obtained by the selecting unit 3004 from the monitoring unit 3002 is not particularly limited in accordance with embodiments of the disclosure. However, in some examples, the result of the monitoring from the monitoring unit 3002 includes information of the change in connections for the target account between each of the instances of time. That is, monitoring unit may provide information such as the delta (or change) of connections between the instance of time T1 and T2, and between the instance of time T2 and T3 as illustrated in FIGS. 4A and 4B of the present disclosure. In other examples, the monitoring unit may provide a list of the new connections which have been established and/or the previous connections which have been neglected in addition to information regarding the time at which those changes occurred.

Based on the result of the monitoring, the selecting unit 3004 is then configured to select accounts which belong to a first and second set of accounts.

The selecting unit 3004 selects accounts which belong to the first set of accounts as those accounts with an increase of connections to accounts in the network with which the target account has no previous connection, above a first threshold level. The first set of accounts therefore corresponds to the region 5004 described with reference to FIG. 5 of the present disclosure.

Furthermore, the selecting unit 3004 selects accounts which belong to the second set of accounts as those accounts with a decrease in connections to accounts in the network with which the target account has a previous connection, above a second threshold level. The second set of accounts therefore corresponds to the region 5002 described with reference to FIG. 5 of the present disclosure.

As explained with reference to FIG. 5 of the present disclosure, the first and second threshold level are predetermined threshold levels which are set based on information regarding the type of accounts which are to be monitored and/or the situation to which the embodiments of the disclosure are applied. However, it will be appreciated that there are a number of different types of thresholds which may be used by the selecting unit 3004 in order to select accounts belonging to the first and second set of accounts.

In some examples, the first threshold level and/or the second threshold level may be an absolute number of increased or decreased connections between instances of time respectively. That is, the first threshold may be set to a value of 5 new connections within a period of time (such as a couple of days, weeks or months). Likewise, the second threshold level may be set at an absolute number of reductions. Target accounts in the network which display more than this number of new connections within the required period of time (e.g. 6, 7, 8 or even more new connections) will be selected as accounts which belong to the first set of accounts. In other words, if the number of new connections which have been created within a certain time window exceeds the predetermined level (indicated by the first threshold value) then the account will be identified as belonging to the first set of accounts. However, the first and second threshold values are not limited to these specific examples.

In some examples, the first threshold level and/or the second threshold level may relate to a relative number of increased or decreased connections between instances of time respectively. That is, the first threshold, for example, may be sent to a relative or percentage increase in the number of new connections within a period of time (and likewise, the second threshold level to a relative or percentage decrease). In this situation, accounts which have experienced a large and rapid increase or decrease in the number of connections relative to their typical number of connections will be selected as accounts belonging to at least one of the first and second group. This may be advantageous, as the selection is based relative to the typical number of connections for any given account.

Indeed, in some examples, the first threshold level and/or the second threshold level is a rate of increased connections across the number of instances of time respectively. This may be advantageous because the rate of change (i.e. how quickly a series of new connections are established) is often indicative of a change of behaviour of the account (with a fraudster typically establishing a number of new connections in rapid succession in the event of an account takeover, for example).

In all of the above examples, the selecting unit 3004 is able to select accounts as belonging to at least one of either the first and/or second set of accounts based on a comparison of the change of the connections established for an account with the predetermined threshold values Tr. 1 and Tr. 2.

However, the present disclosure is not particularly limited to selecting accounts based solely on a comparison of the change of accounts to predetermined threshold value. That is, in some examples, the selecting unit 3004 may be further configured to generate at least one value indicative of the increase of connections to accounts in the network with which the target account has no previous connections and/or the decrease in connections to accounts in the network with which the target account has a previous connection. This value can provide increased information regarding the change in accounts, which can be used to both detect the change and explain how the change has occurred.

Consider, for example, the example of FIG. 6 of the present disclosure. In this example, a similar parameter space to that described with reference to FIG. 5 of the present disclosure is shown. That is, FIG. 6 illustrates an example of a selection process for accounts in accordance with embodiments of the disclosure.

Accounts which exhibit little to no change in connections to other accounts in the network are located in the region "No change" of FIG. 6 (corresponding to region 5000 of FIG. 5 of the present disclosure). Accounts which show no increase in new relationships (or connections) but display a reduction in old relationships are located in the region, "No new relationships & Reduce old relationships", which corresponds to region 5002 of FIG. 5 of the present disclosure. The region, "New relationships & Continue old relationships" of FIG. 6 corresponds to region 5004 of FIG. 5 of the present disclosure (being accounts showing a rapid increase in connections). Finally, the region "New relationships & Reduce old relationships" of FIG. 6 corresponds to region 5006 of FIG. 6 and is typically occupied by accounts which are most likely to be involved in a change towards illicit behaviour.

However, in contrast to the example described with reference to FIG. 5 of the present disclosure, in this example the accounts are not only selected by comparison of the behaviour of that account in comparison to a predetermined threshold level. Rather, in this example, additional information (such as a value indicating the strength of the change) is determined in order to provide additional information regarding the accounts.

Consider an example where an account exhibits a rate of increase of new accounts just below the threshold level Tr. 1 described with reference to FIG. 5, and a rate of decrease (or reduction) in established relationships at a level just below the threshold level Tr. 2 as described with reference to FIG. 5 of the present disclosure. In this example, the account will not be selected for either the first or second set of accounts (since it does not exceed either the first or second threshold level). However, since the account is just below the first threshold level and the second threshold level respectively, a slight increase in the rate of change of connections could move the account from the "No change" region to the "New relationships & Reduce old relationships" region of the parameter space. Therefore, in some examples, at least one value (such as a score or the like) may be determined by the selecting unit 3004 in order to indicate that the account may still be considered as a potentially interesting account from amongst the plurality of target accounts. The value of the score may increase the higher up the x or y axis the account is located. Indeed, in some examples, a separate score may be provided for each of the x and y axis respectively. Analysis of this score produced by the selecting unit 3004 will then provide additional information regarding the behaviour of the account and its location on the parameter space, thus further improving the reliability of the identification of accounts of interest. This information may further demonstrate or explain a characteristic of an account that has been selected for either the first and/or second group of accounts (such as explaining how far above the respective threshold level the account is located). This may further increase the understanding of the change of behaviour leading to the account being identified as an account of interest.

Furthermore, in some examples, the selecting unit 3004 may further be configured to generate the value or score indicative of the type of change based on the type of previous connection which has been neglected. That is, in some examples, the more long-standing and established a previous connection has been, then the more unusual it may be when an account suddenly stops interacting with that account (such that the connection is neglected). Accordingly, the value or score indicative of the type of change may increase when the account has neglected a number of its most long-standing connections.

In some examples, the selecting unit 3004 may further be configured to continually update the first and second set of accounts as further information is received from the monitoring unit 3002. That is, certain accounts which have been added to the first and/or second set of accounts may subsequently be removed if they exhibit no further unusual behaviour within a certain period of time.

Specifically, in some examples, the selecting unit 3004 may be configured to remove an account from the first set of accounts and/or the second set of accounts after a predetermined time when the increase or decrease of connections during the predetermined time is below the first threshold level and the second threshold level respectively. That is, in some examples, once an account has been added to the first set of accounts and/or the second set of accounts, that account will remain in that set of accounts (even if the subsequent levels of changes of connections observed by monitoring unit 3002) fall below the respective threshold levels, until a predetermined period of time has passed since the account was added to the first and/or second set of accounts respectively. This ensures that once an account has displayed a degree of suspicious behaviour (such as a rapid increase in new connections) it will remain in the first set of accounts (and will therefore be treated as a potentially interesting account) until a sufficient predetermined period of time has passed such that the account can be deemed safe (or low interest) again. Any further activity which would place the account within the first and/or second set of accounts before the account has been removed from those sets of accounts will reset the timer for the predetermined period of time for that account to be removed. This further improves the reliability of the identification of accounts of interest, and ensures that short-term fluctuations in account connections do not go undetected by apparatus 1000.

Furthermore, in examples, the monitoring unit 3002 may be configured to monitor the target accounts for a predetermined time after receiving the information indicative of the plurality of target accounts. Then, the selecting unit 3004 may be configured to remove a target account from the plurality of target accounts when the target account has not been selected for the first set of accounts within the predetermined time. This is particularly advantageous when information regarding a very large number of accounts has been received by the receiving unit. If an account which is being monitored does not show any such rapid increase in the number of connections (and thus does not appear in the first set of accounts) it can be determined that the account is, at present, stable and does not show signs of a change towards illicit behaviour. As such, in order to further improve the processing efficiency, in some examples, accounts which have not shown any rapid increase in the number of new connections within a predetermined time of the request (and thus are not part of the first set of accounts) may be removed from the plurality of target account. As described with reference to FIG. 5 of the present disclosure, the earliest sign of a change towards illicit behaviour is often that of an account showing a rapid increase in the number of connections.

In this manner, the selecting unit 3004 is configured to select accounts belonging to the first and/or second set of accounts.

<Identifying Unit>

As the accounts are being monitored and selected (by the monitoring unit 3002 and the selecting unit 3004 respectively), the identifying unit 3006 is configured to identify at least one target account of the plurality of target accounts as an account of interest when the at least one target account is present in both the first and second set of accounts.

In examples, the identifying unit 3006 may receive information regarding the target accounts which are part of the first and/or second set of accounts directly from the selecting unit 3004. However, in other examples, the selecting unit 3004 may record this information in a storage unit (such as storage 1004 described with reference to FIG. 1 of the present disclosure). Then, identifying unit 3006 may obtain information regarding the accounts which are part of the first and second set of accounts from the storage unit.

Furthermore, in some examples, the identifying unit 3006 may identify those accounts which form part of both the first and second set of accounts through a comparison (such as a lookup table or the like) of unique account identifiers which are recorded, by the selecting unit 3004, in both the first and second set of accounts. However, the present disclosure is not particularly limited in this regard, and any method for identifying accounts present in both the first and second set of accounts may be used by identifying unit 3006 as required depending on the situation to which embodiments of the disclosure are applied.

Now, it will be appreciated that by identifying accounts which form part of both the first and second set of accounts, the identifying unit 3006 is able to identify those accounts which are the most likely to be engaged in certain types of illicit behaviour from amongst the plurality of target accounts. That is, the identifying unit 3006 is able to identify accounts which occupy the region 5006 of the parameter space described with reference to FIG. 5 of the present disclosure as accounts which are accounts of interest. That is, accounts which form part of both the first and second set of accounts display a rapid increase in new connections and a reduction in connection to previous connections. These accounts are therefore the accounts of interest as these behaviours may be the earliest sign of a change from legitimate to criminal (or otherwise illicit) behaviour. Identifying accounts of interest in this manner, using the first and second set of accounts, provides a particularly efficient and reliable way to identify accounts of interest in the network of accounts.

Moreover, it will be appreciated that the number of accounts which are present in both the first and second set of accounts (and thus the number of accounts which are identified as accounts of interest) may be considerably smaller than the total number of target accounts being monitored by the monitoring unit 3002 (being at least a portion of the total number of accounts in the network). Therefore, by identifying a limited number of accounts as accounts of interest in this manner, embodiments of the disclosure significantly reduce the amount of investigatory work and processing which need be performed in order to detect fraudulent activity. That is, more computationally expensive processing and investigatory work may be restricted to those accounts which have been identified as accounts of interest by identifying unit 3006 of apparatus 1000 (as opposed to being applied to each and every account in the network).

In some examples, the identifying unit 3006 may be configured to generate a flag indicating that the at least one target account is an account of interest. That is, when at least one account has been identified as an account of interest, a flag (or other form of notification or warning message) may be produced by identifying unit 3006 in order to inform an interested party (such as the party who provided the initial list of target accounts) that an account has been identified as an account of interest (being, in this example, an account which may be engaged in illicit behaviour). Once this flag (or other form of notification) has been generated, the interested party may then perform more detailed and computationally expensive investigations into the account which may, if the account is indeed determined to be engaged in illicit behaviour, lead to the subsequent closure of the account.

Furthermore, in some examples, the identifying unit 3006 may be configured to report certain additional information, such as the at least one value determined by the selecting unit 3004, when an account has been identified as an account of interest. Reporting this additional information alongside the notification of the account of interest enables a more complete and comprehensive understanding of the changes of behaviour of the account which lead to the account being identified as an account of interest (and thus being an account worthy of further investigations). This may further improve the degree of trust and reliability in the accounts which have been identified as accounts of interest.

<Advantageous Technical Effect>

According to embodiments of the disclosure, an account of interest in a network of accounts can be efficiently and reliably detected. In particular, by monitoring changes in an account's connections, the earliest signs of illicit behaviour (such as account takeovers or money-laundering activity) can be reliably detected enabling the account to be investigated and/or shut down before further illicit behaviour can be performed. Moreover, since efficient initial processing of the accounts in the network is performed in order to identify accounts which are potentially engaged in illicit behaviour, more detailed investigatory processing can be reserved for the accounts of interest. This improves leads to improvements in processing efficiency when detecting fraudulent activity and fraudulent accounts in a network.

Of course, the present disclosure is not particularly limited to the above-identified advantageous technical effects. Other advantageous technical effects will become apparent to the skilled person when reading the disclosure.

<Method>

Figure 7:
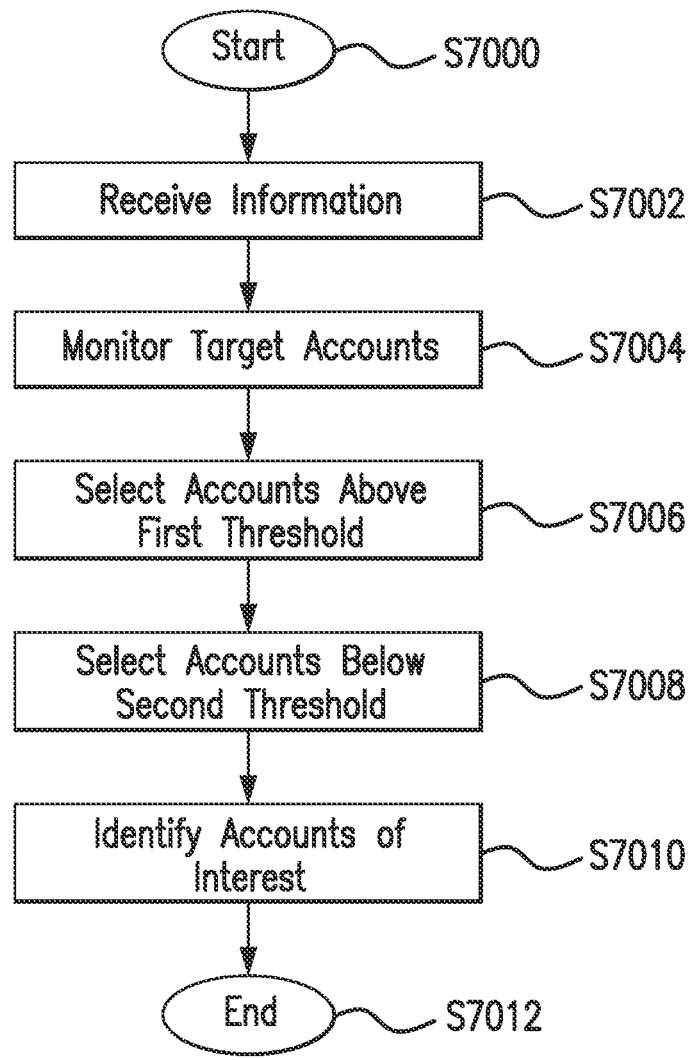
FIG. 7 illustrates an example method in accordance with embodiments of the disclosure.

Hence, more generally, a method of identifying accounts of interest in a network is provided in accordance with embodiments of the disclosure. The method may be performed by controlling circuitry (such as apparatus 1000) to perform the steps of the method. An example method in accordance with embodiments of the disclosure is shown in FIG. 7 of the present disclosure.

The method starts at step S7000 and proceeds to step S7002.

In step S7002 the method comprises receiving information indicative of a plurality of target accounts, the plurality of target accounts including at least a portion of the accounts in the network.

Once the information has been received, the method proceeds to step S7004.

In step S7004, the method comprises monitoring for each target account of the plurality of target accounts, at a number of instances of time, connections between that target account and other accounts in the network.

Once the accounts have been monitored for a number of instances of time, the method proceeds to step S7006 and S7008.

In step S7006, the method comprises using a result of the monitoring, to select target accounts associated with an increase of connections to accounts in the network with which the target account has no previous connection, above a first threshold level, as a first set of accounts.

In step S7008, the method comprises using a result of the monitoring, to select target accounts associated with a decrease in connections to accounts in the network with which the target account has a previous connection, above a second threshold level, as a second set of accounts.

The method then proceeds to step S7010.

In step S7010, the method comprises identifying at least one target account of the plurality of target accounts as an account of interest when the at least one target account is present in both the first and second set of accounts.

Finally, the method proceeds to, and ends with, step S7012.

It will be appreciated that the method of the present disclosure is not particularly limited to the specific ordering of steps as illustrated in the example of FIG. 7 of the present disclosure. Rather, a number of the individual steps may be performed, alternatively, in parallel. Moreover, a number of the individual method steps may be performed a number of times as the plurality of accounts are being monitored.

<Clauses>

It will be appreciated that embodiments of the present disclosure may further be arranged in accordance with the following numbered clauses:

1. Method of identifying accounts of interest in a network, the method comprising controlling circuitry to:
   receive information indicative of a plurality of target accounts, the plurality of target accounts including at least a portion of the accounts in the network;
   monitor for each target account of the plurality of target accounts, at a number of instances of time, connections between that target account and other accounts in the network;
   using a result of the monitoring, select target accounts associated with an increase of connections to accounts in the network with which the target account has no previous connection, above a first threshold level, as a first set of accounts;
   using a result of the monitoring, select target accounts associated with a decrease in connections to accounts in the network with which the target account has a previous connection, above a second threshold level, as a second set of accounts; and
   identify at least one target account of the plurality of target accounts as an account of interest when the at least one target account is present in both the first and second set of accounts.

2. The method according to Clause 1, wherein the number of instances of time include at least a first and second instance of time.

3. The method according to Clause 1 or 2, wherein a connection is created at least by an interaction between two accounts in the network.

4. The method according to any preceding Clause, wherein a connection is removed at least when there have been no further interactions between two accounts in the network for a predetermined period of time.

5. The method according to Clause 3 or 4, wherein an interaction includes a transfer between two accounts in the network.

6. The method according to any preceding Clause, wherein an operator of an account can request a connection between that account and another account in the network is created or removed.

7. The method according to any preceding Clause, wherein the first threshold level and/or the second threshold level is an absolute number of increased or decreased connections between instances of time respectively.

8. The method according to any preceding Clause, wherein the first threshold level and/or the second threshold level is a relative number of increased or decreased connections between instances of time respectively.

9. The method according to any preceding Clause, wherein the first threshold level and/or the second threshold level is a rate of increased connections across the number of instances of time respectively.

10. The method according to any preceding Clause, wherein the accounts are bank accounts in a banking network and an account of interest is a potentially fraudulent account.

11. The method according to any preceding Clause, wherein a result of the monitoring includes information of the change in connections for the target account between each of the instances of time.

12. The method according to any preceding Clause, wherein monitoring each target account includes obtaining information regarding the creation or removal of connections between the target account and other accounts on the network.

13. The method according to Clause 12, wherein the information regarding the creation or removal of connections between the target account and other accounts on the network is stored in a storage unit.

14. The method according to any preceding Clause, wherein the method comprises monitoring the target accounts for a predetermined time after receiving the information indicative of the plurality of target accounts; and removing a target account from the plurality of target accounts when the target account has not been selected for the first set of accounts within the predetermined time.

15. The method according to any preceding Clause, comprising removing an account from the first set of accounts and/or the second set of accounts after a predetermined time when the increase or decrease of connections during the predetermined time is below the first threshold level and the second threshold level respectively.

16. The method according to any preceding Clause, comprising generating a flag indicating that the at least one target account is an account of interest.

17. The method according to any preceding Clause, wherein the information indicative of the plurality of target accounts includes a list of unique account identifiers.

18. The method according to any preceding Clause, comprising generating at least one value indicative of the increase of connections to accounts in the network with which the target account has no previous connections and/or the decrease in connections to accounts in the network with which the target account has a previous connection; and reporting the at least one value when an account has been identified as an account of interest.

19. The method according to any preceding Clause, wherein a previous connection includes a connection which exists before a current instance of time.

20. Apparatus for identifying accounts of interest in a network, the apparatus comprising circuitry configured to:
   receive information indicative of a plurality of target accounts, the plurality of target accounts including at least a portion of the accounts in the network;
   monitor for each target account of the plurality of target accounts, at a number of instances of time, connections between that target account and other accounts in the network;
   using a result of the monitoring, select target accounts associated with an increase of connections to accounts in the network with which the target account has no previous connection, above a first threshold level, as a first set of accounts;
   using a result of the monitoring, select target accounts associated with a decrease in connections to accounts in the network with which the target account has a previous connection, above a second threshold level, as a second set of accounts; and
   identify at least one target account of the plurality of target accounts as an account of interest when the at least one target account is present in both the first and second set of accounts.

21. Computer program product comprising computer readable instructions which, when the instructions are implemented by a computer, cause the computer to perform a method of identifying accounts of interest in a network, the method comprising:
    receiving information indicative of a plurality of target accounts, the plurality of target accounts including at least a portion of the accounts in the network;
    monitoring for each target account of the plurality of target accounts, at a number of instances of time, connections between that target account and other accounts in the network;
    using a result of the monitoring, selecting target accounts associated with an increase of connections to accounts in the network with which the target account has no previous connection, above a first threshold level, as a first set of accounts;
    using a result of the monitoring, selecting target accounts associated with a decrease in connections to accounts in the network with which the target account has a previous connection, above a second threshold level, as a second set of accounts; and
    identifying at least one target account of the plurality of target accounts as an account of interest when the at least one target account is present in both the first and second set of accounts.

It will further be appreciated that while examples of the present disclosure have been described with reference to the specific example of detecting accounts of interest in a situation such as that illustrated in FIG. 2 of the present disclosure (i.e. a banking network or the like) the present disclosure is not particularly limited in this regard. That is, embodiments of the present disclosure may also be applied to the identification of accounts of interest in any suitable network of accounts as desired. For example, in embodiments of the present disclosure may be applied to the detection of an account take over or hacking of a messaging service such as email accounts or the like. Moreover, embodiments of the present disclosure may also be used in order to detect illicit activity in social media accounts or the like (where a rapid increase in the number of new connections coupled with a degree of neglection of old connections may be indicative of an account take over or other suspicious activity). Indeed, the present disclosure is not particularly limited to these further examples. In fact, it will be understood that technical effects including an increased processing efficiency in the detection of accounts of interest may be achieved by embodiments of the disclosure regardless of the specific type of account (or the type of network of accounts) to which the embodiments of the disclosure are applied.

While numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. Method of identifying accounts of interest in a network comprising a plurality of accounts, the method comprising controlling circuitry to:
    receive information indicative of a plurality of target accounts, the plurality of target accounts including at least a portion of the accounts in the network;
    monitor, for each target account of the plurality of target accounts, at a number of instances of time, connections between that target account and other accounts in the network;
    using a result of the monitoring, select one or more of the target accounts having an increase of connections during the number of instances of time to accounts in the network with which the target account has no previous connection, above a first threshold level, as a first set of accounts;
    using a result of the monitoring, select one or more of the target accounts having a decrease in connections during the number of instances of time to accounts in the network with which the target account has a previous connection, above a second threshold level, as a second set of accounts;
    compare the first set of accounts to the second set of accounts; and
    based on the comparison, identify an account of interest, wherein the account of interest is included in both the first and second set of accounts.

2. The method according to claim 1, wherein the number of instances of time include at least a first and second instance of time.

3. The method according to claim 1, wherein a connection is created at least by an interaction between two accounts in the network.

4. The method according to claim 1, wherein a connection is removed at least when there have been no further interactions between two accounts in the network for a predetermined period of time.

5. The method according to claim 3, wherein an interaction includes a transfer between two accounts in the network.

6. The method according to claim 1, wherein an operator of an account can request a connection between that account and another account in the network is created or removed.

7. The method according to claim 1, wherein the first threshold level and/or the second threshold level is an absolute number of increased or decreased connections between two of the instances of time, respectively.

8. The method according to claim 1, wherein the first threshold level and/or the second threshold level is a relative number of increased or decreased connections between two of the instances of time, respectively.

9. The method according to claim 1, wherein the first threshold level and/or the second threshold level is a rate of increased connections across the number of instances of time respectively.

10. The method according to claim 1, wherein the accounts are bank accounts in a banking network and the account of interest is a potentially fraudulent account.

11. The method according to claim 1, wherein a result of the monitoring includes information of a change in connections for each target account between each of the instances of time.

12. The method according to claim 1, wherein monitoring each target account includes obtaining information regarding creation or removal of connections between the target account and the other accounts in the network.

13. The method according to claim 12, wherein the information regarding the creation or removal of connections between each target account and the other accounts in the network is stored in a storage unit.

14. The method according to claim 1, further comprising:
monitoring the plurality of target accounts for a predetermined time after receiving the information indicative of the plurality of target accounts; and
removing a target account from the plurality of target accounts after the target account has not been selected for the first set of accounts within the predetermined time.

15. The method according to claim 1, comprising removing a target account from the first set of accounts and/or the second set of accounts after a predetermined time after the increase or decrease of connections during the predetermined time is below the first threshold level and the second threshold level respectively.

16. The method according to claim 1, wherein identifying the account of interest includes generating a flag for the account of interest.

17. The method according to claim 1, wherein the information indicative of the plurality of target accounts includes a list of unique account identifiers.

18. The method according to claim 1, comprising generating at least one value indicative of the increase of connections to the accounts in the network with which the target account has no previous connections and/or the decrease in connections to accounts in the network with which the target account has a previous connection; and reporting the at least one value when an account has been identified as an account of interest.

19. Apparatus for identifying accounts of interest in a network comprising a plurality of accounts, the apparatus comprising circuitry configured to:
receive information indicative of a plurality of target accounts, the plurality of target accounts including at least a portion of the accounts in the network;
monitor, for each target account of the plurality of target accounts, at a number of instances of time, connections between that target account and other accounts in the network;
using a result of the monitoring, select one or more of the target accounts having an increase of connections during the number of instances of time to accounts in the network with which the target account has no previous connection, above a first threshold level, as a first set of accounts;
using a result of the monitoring, select one or more of the target accounts having a decrease in connections during the number of instances of time to accounts in the network with which the target account has a previous connection, above a second threshold level, as a second set of accounts;
compare the first set of accounts to the second set of accounts; and
based on the comparison, identify an account of interest, wherein the account of interest is included in both the first and second set of accounts.

20. A non-transitory machine-readable medium comprising computer readable instructions which, when the instructions are implemented by a computer, cause the computer to perform a method of identifying accounts of interest in a network comprising a plurality of accounts, the method comprising:
receiving information indicative of a plurality of target accounts, the plurality of target accounts including at least a portion of the accounts in the network;
monitoring, for each target account of the plurality of target accounts, at a number of instances of time, connections between that target account and other accounts in the network;
using a result of the monitoring, selecting one or more of the target accounts having an increase of connections during the number of instances of time to accounts in the network with which the target account has no previous connection, above a first threshold level, as a first set of accounts;
using a result of the monitoring, selecting one or more of the target accounts having a decrease in connections during the number of instances of time to accounts in the network with which the target account has a previous connection, above a second threshold level, as a second set of accounts;
comparing the first set of accounts to the second set of accounts; and
based on the comparison, identifying an account of interest, wherein the account of interest is included in both the first and second set of accounts.

* * * * *